United States Patent [19]

Chipper et al.

[11] 4,055,316
[45] Oct. 25, 1977

[54] METHOD AND EQUIPMENT FOR AERIAL TRANSPORT

[76] Inventors: John Lester Chipper, Bates Street, Rabaul, Papua; Donald Bruce Owner, Taurama Road, Port Moresby, Papua, both of New Guinea

[21] Appl. No.: 674,635

[22] Filed: Apr. 7, 1976

[51] Int. Cl.² ............................................. B64B 1/50
[52] U.S. Cl. ......................................... 244/33; 104/22; 104/23 R; 104/123; 244/94; 244/96; 212/71
[58] Field of Search ............... 244/96, 33, 94, 30; 212/71, 81, 72, 74, 76, 78, 82, 83, 84, 85, 98, 99, 116, 117; 104/22, 23 R, 23 FS, 112, 123; 61/107, 112; 9/8 R

[56] References Cited

U.S. PATENT DOCUMENTS

| 328,899 | 10/1885 | Morrison | 244/33 |
| 1,391,794 | 9/1921 | Rutherford | 104/22 |
| 1,430,868 | 10/1922 | Weyrick | 244/94 |
| 2,740,598 | 4/1956 | Van Krevelen | 244/96 |
| 3,270,895 | 9/1966 | Stewart | 244/33 |
| 3,448,864 | 6/1969 | Fenn et al. | 244/33 |
| 3,456,903 | 7/1969 | Papst | 244/30 |
| 3,620,028 | 11/1971 | Wilde | 61/112 |
| 3,706,385 | 12/1972 | Stewart | 212/71 |
| 3,807,617 | 4/1974 | Tanksley | 61/107 |

FOREIGN PATENT DOCUMENTS

| 384,148 | 3/1908 | France | 244/33 |

Primary Examiner—Stephen G. Kunin
Assistant Examiner—Galen Barefoot
Attorney, Agent, or Firm—McDougall, Hersh & Scott

[57] ABSTRACT

Method and equipment to aerially transport loads between two sites. A winch is provided at each site and a load carrying balloon is coupled by cables to each winch. Auxiliary balloons are provided to maintain the cables at a height above objects in the line of travel of the balloon.

6 Claims, 4 Drawing Figures

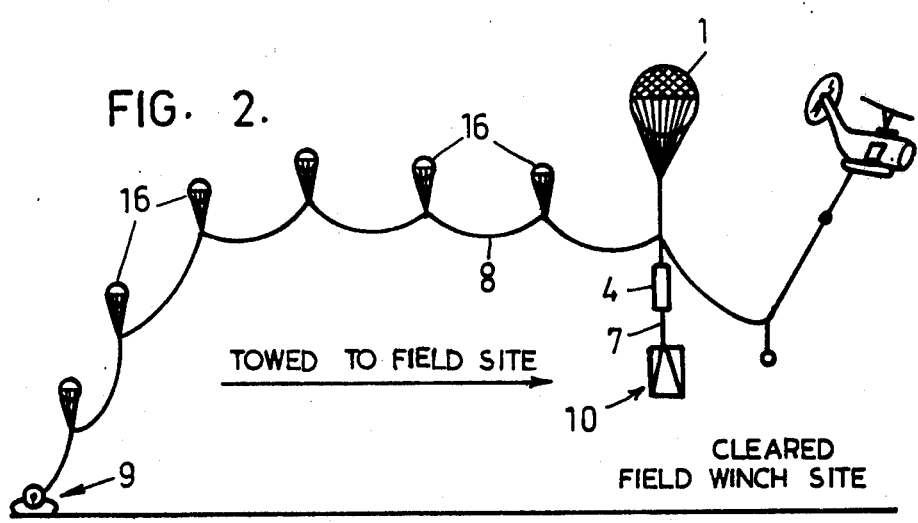
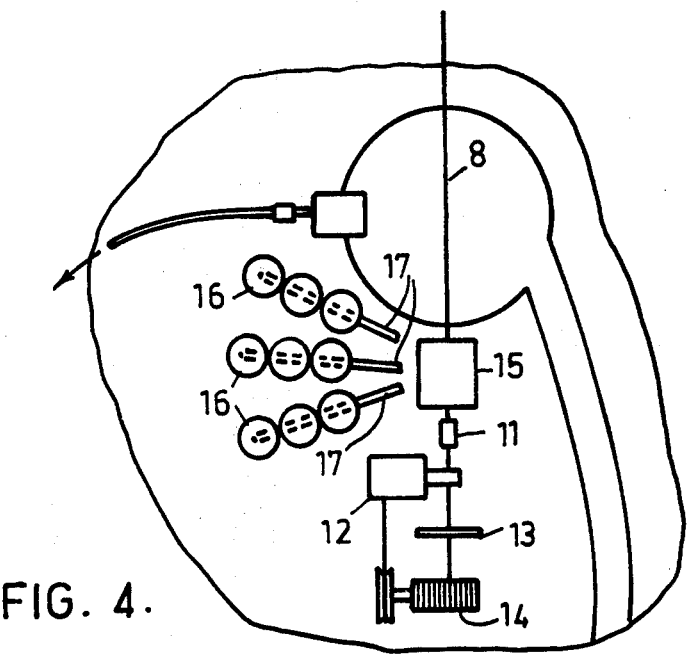

METHOD AND EQUIPMENT FOR AERIAL TRANSPORT

This invention relates to aerial transporation method means to transport articles between sites. More particularly heavy articles between sites not usually readily accessable one with the other.

Some examples of the use to which the means of the invention can be put is the transportation of logs from inaccessable locations where the tree is felled to a mill or log storage yard. Another example is the transportation of freight from a vessel off-shore to a location on-shore, or vice versa. Yet another example is the utilization of the means in place of tower cranes for multi-storey building construction, use in ferrying drilling equipment or mining equipment from road heads to site and use for heavy lifts at the side of ships or in any heavy lift operation.

Although it is known to raise and move loads by the means of balloons the commercial utilization of balloons for this purpose has been hampered by other operating factors such as ease of ballasting and the means for directing the balloon once it has been loaded so that the load can be delivered to the precise location required.

Accordingly the invention provides a method of aerially transporting loads between two sites, said method including the steps of locating a winch assembly at each of two sites, attaching a ballasted inflated lift balloon by a cable to each winch assembly so that the lift balloon can be moved fron one site to the other by winding cable on to a winch of one assembly and releasing cable from the winch of the other assembly, connecting removable support balloons to each cable to support the cable above any obstacles between sites, winching the lift balloon to one site whilst progressively removing and adding support balloons to the respective cables, loading the lift balloon at one site by suspending a load from the lift balloon, ejecting an amount of ballast corresponding to the load added to the lift balloon, winching the lift balloon to the other site whilst removing and adding support balloons to the respective cables, removing the load from the lift balloon at said other site and reballasting the lift balloon and repeating the steps as above to return the ballasted balloon to said one site.

The invention further provides apparatus to carry out the above method comprising an inflated lift balloon having attached thereto a dischargable ballast holder and load attachment means, cables connecting the lift balloon to two winch assemblies each including a winch, means to store support balloons at each site each having means whereby they can be coupled to the cables connecting the lift balloon to winch assemblies and means at at least one site to add ballast to the ballast holder.

This invention overcomes the foregoing problems in a simple manner as will hereinafter be described with reference to the accompanying drawings in which FIG. 1 illustrates the aerial load transporting system according to the invention.

FIG. 2 illustrates one method of delivering the field winch for the transporting system to a selected prepared site.

FIG. 4 illustrates the method of storing support balloons at the unloading site and also the various components making up the winch assembly at a site.

Figure 1:
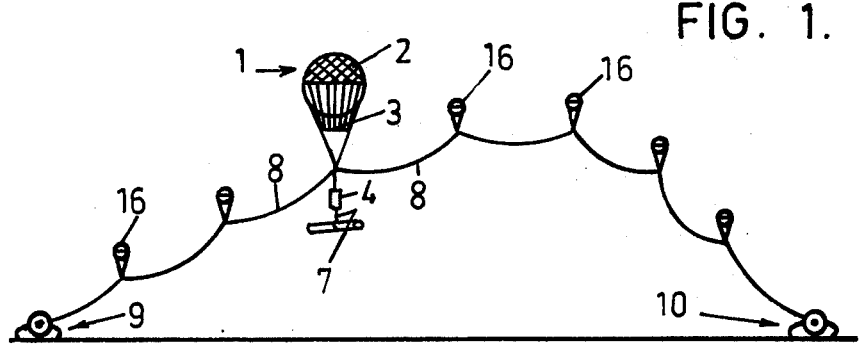

The invention provides a lift balloon 1 which is filled with an amount of gas, preferably helium, which is more than adequate to raise the maximum anticipated load. The balloon is at least partially covered by a mesh cover 2 connected by ropes 3 to a water container 4 which constitutes a ballast tank. A typical arrangement would be one in which the balloon is approximately one hundred feet in diameter and contains 530,000 cubic feet of helium, the ballast tank 4 would contain 2,600 gallons of water and the anticipated working load of the balloon would be in the order of 12 tons.

Figure 3:
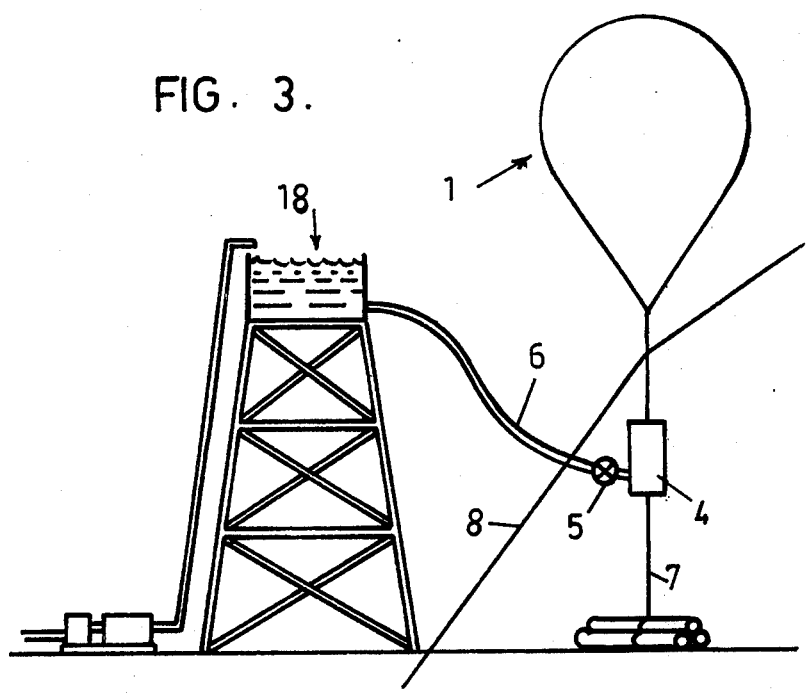
FIG. 3 illustrates one method of ballasting.

The water tank incorporates a water release valve indicated schematically in FIG. 3 and marked 5. The valve 5 can be remote controlled and is in a fill and drain pipe 6 through which ballast water can be discharged or taken on from a reservoir tank to adjust the ballast of the balloon 1.

Hanging from and firmly secured to the water tank is a hook or rope 7 by means of which a load can be coupled to the balloon 1. Preferably the rope 7 includes its own ballast units, such as a ball weight, and in the case of a hook, it would include a swivel to release twists in its supporting rope 7.

Hauling cables 8 connect the balloon to a working winch assembly 9 and a return winch assembly 10. The working winch assembly 9 is located at a site having an access road and an unloading area together with handling equipment for support balloons. Referring now to FIG. 4, the winch assembly indicated generally 9 combines a rope sheave 11, a winch and motor 12, a cable tensioning device 13 and a cable storage drum 14.

There is also a balloon handling station 15 where support balloons 16 are stored in racks 17. The support balloons are placed as required on the cable between winch 12 and the balloon 1 to hold the cable aloft above obstacles, e.g. trees.

The winch assembly 10 and balloon handing equipment located at the work site would comprise items 11A to 17A inclusive duplicating items 11 to 17 described above The support balloons are, for example, about 32 feet in diameter, contain 343,000 cubic feet of helium and each has a lift of approximately 900 pounds.

The support balloons are adjusted by number and lift potential to suit the tension to be placed on the hauling cables. For example the hauling cable to the winch 12 would have sufficient support balloons attached to maintain the hauling cable in an elevated condition, i.e. above the tops of trees in a forest, when a hauling load is applied sufficient to move the lift balloon and the supported load under all conditions, which may for example include head winds, at about 12 miles per hour which is calculated to be an optimum working speed.

In operation the system involves locating a water ballasted lift balloon over the load by winding cable onto drum 14A and releasing the cable at the same time from drum 14. The load is coupled to the balloon with an associated ejection of ballast and the balloon is then allowed to rise and is winched back to the unloading area. The load is removed and the balloon is re-ballasted by pumping water into the tank 4. The system is then ready for a repeat sequence.

The controls for winching, water dumping and water loading are preferably remotely activated by radio signals. It would also be possible, as an alternative and in some locations of use, e.g. when logging in mountainous country, to have a raised reservoir or pond from which water would be gravitationally directed into the ballast tank to avoid the need to pump water into the ballast tank.

It is presently the intention that water should be pumped from a source of supply into a raised water tank 18 as shown in FIG. 3. This water tank is primarily designed to provide ballasting water but can also accept water from the ballast tank should such discharge be required.

Although water has been specified as the ballasting medium other ballasting mediums may be used and the invention is not to be considered limited to the use of water ballast. Water has been specified because of the ease of handling of this material but solid ballast means could be provided if readily available and at cheap cost.

From the foregoing description the operation of the system can be clearly understood and the invention is defined in the following claims.

We claim:

1. A method of aerially transporting loads between two sites, said method including the steps of locating a winch assembly at each of said two sites, attaching a ballasted inflated lift balloon by a cable to each winch assembly so that the lift balloon can be moved from one site to the other by winding cable on to a winch of one assembly and releasing cable from the winch of the other assembly, connecting removable support balloons to each cable to support the cable above any obstacles between sites, winching the lift balloon to one site whilst progressively removing and adding support balloons to the respective cables, loading the lift balloon at one site by suspending a load from the lift balloon, ejecting an amount of ballast corresponding to the load added to the lift balloon, winching the lift balloon to the other site whilst removing and adding support balloons to the respective cables, removing the load from the lift balloon at said other site and reballasting the lift balloon and repeating the steps as above to return the ballasted balloon to said one site.

2. Equipment for aerial transport of loads between two sites comprising an inflated lift balloon, a dischargeable ballast holder connected to said balloon for ballast thereof, means for attachment of said load to said balloon, two winch assemblies each of which includes a winch, cables connecting the lift balloon to said winch assemblies and to each site, means for storing support balloons at each site, means for coupling said support balloons to said cables connecting said lift balloon to each said site, and means at at least one of the sites to add ballast to the ballast holder.

3. Equipment as claimed in claim 2 including valve means on the ballast holder whereby liquid ballast may be added to or ejected from the ballast holder.

4. Equipment as claimed in claim 3, including remote control means for the valve means.

5. Equipment as claimed in claim 2 including a cable tensioning and guiding device associated with the winch assemblies.

6. Equipment as claimed in claim 2 wherein said means to add ballast is capable fo receiving ejected ballast.

* * * * *